(12) United States Patent  
Katz et al.

(10) Patent No.: US 7,957,505 B1
(45) Date of Patent: Jun. 7, 2011

(54) X-RAY RADIOGRAPHY FOR CONTAINER INSPECTION

(75) Inventors: Jonathan I. Katz, Clayton, MO (US); Christopher L. Morris, Los Alamos, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 1121 days.

(21) Appl. No.: 11/684,667

(22) Filed: Mar. 12, 2007

(51) Int. Cl.
*G01B 15/02* (2006.01)
*G21K 1/00* (2006.01)
*G21K 1/02* (2006.01)

(52) U.S. Cl. .......................... 378/57; 378/154; 378/147

(58) Field of Classification Search .............. 378/4, 19, 378/57, 108, 154, 155, 147
See application file for complete search history.

(56) References Cited

U.S. PATENT DOCUMENTS

| | | | |
|---|---|---|---|
| 2,730,566 A * | 1/1956 | Maclaughlin, Jr. et al. | 378/98.6 |
| 4,179,100 A | 12/1979 | Sashin et al. | |
| 5,012,498 A * | 4/1991 | Cuzin et al. | 378/22 |
| 5,461,653 A | 10/1995 | Parker | |
| 5,493,596 A | 2/1996 | Annis | |
| 5,638,420 A | 6/1997 | Armistead | |
| 5,838,759 A | 11/1998 | Armistead | |
| 6,058,158 A | 5/2000 | Eiler | |
| 6,151,381 A * | 11/2000 | Grodzins et al. | 378/90 |
| 6,347,132 B1 | 2/2002 | Annis | |
| 6,542,574 B2 | 4/2003 | Grodzins | |
| 6,552,346 B2 | 4/2003 | Verbinski et al. | |
| 6,778,631 B2 | 8/2004 | Franke | |
| 6,785,357 B2 | 8/2004 | Bernardi et al. | |
| 6,998,617 B2 | 2/2006 | D'Emilio et al. | |
| 7,379,530 B2 * | 5/2008 | Hoff et al. | 378/57 |
| 2006/0193434 A1 | 8/2006 | Green | |

* cited by examiner

*Primary Examiner* — Irakli Kiknadze
(74) *Attorney, Agent, or Firm* — Thomas S. O'Dwyer; James C. Durkis; John T. Lucas (57) ABSTRACT

Arrangements of X-ray inspection systems are described for inspecting high-z materials in voluminous objects such as containers. Inspection methods may involve generating a radiographic image based on detected attenuation corresponding to a pulsed beams of radiation transmitted through a voluminous object. The pulsed beams of radiation are generated by a high-energy source and transmitted substantially downward along an incident angle, of approximately 1° to 30°, to a vertical axis extending through the voluminous object. The generated radiographic image may be analyzed to detect on localized high attenuation representative of high-z materials and to discriminate high-z materials from lower and intermediate-z materials on the basis of the high density and greater attenuation of high-z material for higher energy (3-10 MeV) X-rays, and the compact nature of threatening masses of fissionable materials.

12 Claims, 6 Drawing Sheets

X-RAY RADIOGRAPHY FOR CONTAINER INSPECTION

GOVERNMENT INTEREST STATEMENT

The United States Government has rights in this invention pursuant to Contract No. DE-AC52-06NA25396 between the United States Department of Energy/National Nuclear Security Administration and the Los Alamos National Security LLC for the operation of the Los Alamos National Laboratory.

BACKGROUND

1. Field of the Invention

The present invention relates generally to X-ray radiography, and more particularly relates to radiation inspection devices and methods for detecting the presence of high-z materials in containers.

2. Related Art

The detonation of a nuclear weapon in a major city is perhaps the worst terrorist threat imaginable, with casualties and property damage likely exceeding those of past terrorist attacks by a factor of ten or a hundred or even more. The shipping and transportation industry is considered at risk for terrorist activity due to the high volume of containers that moved across borders and low inspection rates. For example in the United States, approximately 7,000,000 cargo containers enter the country by sea each year and about 9,000,000 by land, in addition to the thousands of cargo containers that enter the country by air. Since existing inspection methods are insufficient in detecting the presence of nuclear weapons, each of the containers must be opened and inspected manually. Inspecting each container manually would be time consuming and cause major delays. Thus, of these millions of containers only a comparatively few are opened for inspection, thereby offering a terrorist a potential opening for smuggling a nuclear weapon into a country.

SUMMARY

According to a first broad aspect of the present invention, there is provided an inspection method comprising: generating a radiographic image based on a detected attenuation corresponding to a plurality of pulsed beams of radiation transmitted through a voluminous object; and determining that there is a high-z material in the voluminous object based on a localized high attenuation in the generated radiographic image, wherein the plurality of pulsed beams of radiation are transmitted substantially downward along an incident angle to a vertical axis extending through the voluminous object.

According to a second broad aspect of the invention, there is provided an inspection device for inspecting a voluminous object comprising: a high-energy source for generating a first set of pulsed beams of radiation, wherein the plurality of pulsed beams of radiation are transmitted substantially downward along an incident angle to a vertical axis extending through the voluminous object; means for discriminating against scattered radiation from the plurality of pulsed beams of radiation that are transmitted through the voluminous object; means for generating a radiographic image based on detected attenuation corresponding to the plurality of pulsed beams of radiation transmitted through the voluminous object; and means for determining that a high-z material exists in the voluminous object based a localized high attenuation in the radiographic image.

According to a third broad aspect of the invention, there is provided an inspection device comprising a high-energy source for producing a plurality of pulsed beams of radiation at an incident angle to a vertical axis extending through the voluminous object; one or more upper collimators for filtering the plurality of pulsed beams of radiation into a fan beam of radiation having a width approximate to the width of the voluminous object; one or more lower collimators for shielding scattered radiation from the fan beam of radiation that is scattered within the voluminous object; and a detector array for generating an attenuation signal based on radiation transmitted through the lower collimator, wherein the high-energy source is positioned above the voluminous object, the one or more upper collimators being positioned between the high-energy source and the voluminous object, the one or more lower collimators being positioned directly below the voluminous object and the detector array is positioned below the one or more lower collimators. The one or more lower collimators may include a "Bucky" collimator consisting of narrow hollow tubes in a block of absorbing material, where the tubes are aligned along straight rays from the source of radiation to each element of the detector array.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application. Where the definition of terms departs from the commonly used meaning of the term, applicant intends to utilize the definitions provided below, unless specifically indicated.

DEFINITIONS

For the purposes of the present invention, a step, method or information is "based" on a particular step, method, or information, if that step, method or information is derived by performing a mathematical calculation or logical decision using that step, method, or information.

For the purposes of the present invention, the term "downward" refers to a direction that is towards the ground, i.e. floor, earth, pavement, etc.

For the purposes of the present invention, the term "high-z" refers to a material, element, alloy or compound with a high atomic number. Such elements include those that are used in nuclear weapons, such as uranium and plutonium and their compounds and alloys.

For the purposes of the present invention, the term "incident angle" refers to the angle from a vertical axis at which radiation enters the container under inspection. FIG. 3B illustrates different incident angles.

For the purposes of the present invention, the term "voluminous container" refers to a container that is used in transporting and shipping goods and products. The containers may be shipped by land, air or sea. An exemplary voluminous container is an intermodal container or cargo container having the approximate dimensions of 2.6 meters height by 2.6 meters wide by 12 meters long. This type of voluminous container may hold a load of up to 30 metric tons. It should be appreciated that different sizes of containers that can hold different load amounts may also be inspected using embodiments of the present invention.

DESCRIPTION

Aspects of the present invention provide inspection methods, devices and systems for detecting a high-z material in a voluminous container using pulsed radiation from a high-energy source. The high-z material may be detected as a localized high attenuation in a radiographic image generated from an array of detectors. To determine the presence of high-z material, radiation is emitted substantially downward along an incident angle from the high-energy source and filtered through a series of collimators above the voluminous container. These collimators produce a fan beam of radiation. The fan beam of radiation is as wide as width of the voluminous container under inspection. To enhance the attenuation and reduce scattering detected by the detector array, a second set of lower collimators may be placed between the detector array and voluminous container. Using such methods, devices and systems, embodiments of the present invention allow non-invasive detection of potentially dangerous object that may enter a country.

X-ray radiography is the traditional method of looking inside opaque objects. It works very well for comparatively small objects, but the dimensions of a standard intermodal container (2.6 m×2.6 m×12 m) and heavy and spatially complex loading of such container presents serious obstacles. At a mean density of 300 kg/m$^3$, such a container has column density across its shortest dimension of about 780 kg/m$^2$. The scattering of X-rays of energies less than a few hundred KeV is well described by the Thomson cross-section as giving an opacity of about 0.02 m$^2$/kg for most materials. This leads to 15.6 e-folds (a factor of 1.7×10$^{-7}$) of beam attenuation, which precludes use of these lower energy X-rays for such intermodal containers.

Figure 1:
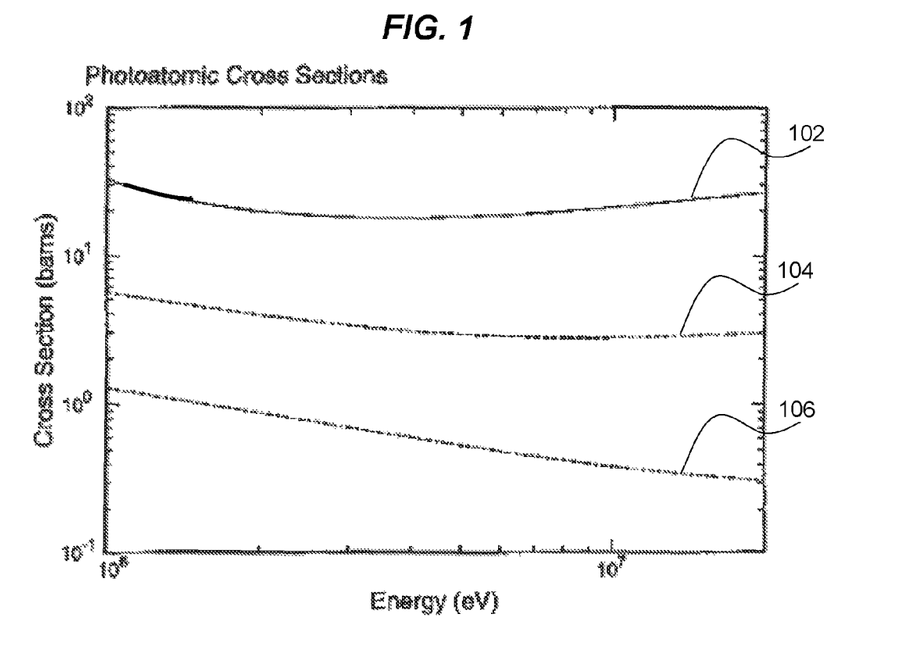
FIG. 1 is a graph comparing the cross-sections of various materials for high energy X-rays.

At higher energies the scattering cross-section is described by the Klein-Nishina formula, and declines nearly as the reciprocal of the energy. For high-Z materials such as uranium and plutonium another absorption process, electron-positron pair production, whose cross-section increases with energy, dominates the attenuation above about 3 MeV. Pair production is less important for lower-Z materials, so their opacities flatten out or continue to decrease as the energy increases, as shown in FIG. 1. FIG. 1 is a graph showing the cross-section of plutonium 102 (z=94) increases with energy while iron 104 (z=26) flattens out and carbon 106 (z=8) continues to decrease. This makes the use of higher energy (3-10 MeV) X-rays particularly advantageous for discriminating high-Z materials from dense bodies of intermediate-Z materials such as iron that are frequently present in innocent cargo.

At energies of several MeV, the beam attenuation across a container filled with 300 kg/m$^3$ of low or medium-Z material is about 2 e-folds (a factor of 0.14), so that X-ray radiography becomes possible. Further, because the opacity (in m$^2$/kg) is larger for high-Z materials, these materials will stand out even more strongly in radiographs than indicated by the material's density alone.

Prior X-ray non-invasive techniques use side vertical illumination. One problem with vertical illumination is that a terrorist could hide his fissionable cargo in the shadow of a larger and deep absorber (such as a 30 MT cube of solid iron). Such a threat could be found by opening the very few containers which show absorption too deep to see through. The innocent shipper can avoid false-positive detection (and the opening of his container) by ensuring that his cargo does not present a deep, spatially localized, absorption maximum in the known direction of irradiation. Embodiments of the present invention use radiation at an oblique downward angle to detect high-z materials. This allows the radiography generated by embodiments of the present invention to identify all containers that might contain a threat, and thus saving the resources required to open and manually inspect the container.

Another existing X-ray detection uses side elevation illumination as shown in U.S. Pat. No. 6,347,132 to Annis. The detection method in the Annis patent uses a low energy source. By using a substantially downward illumination, embodiments of the present invention permit the use of higher energy and more powerful X-ray sources and reduce or eliminate the transmitted and scattered radiation dose and hazard to bystanders and operators because downward radiation will be absorbed by the earth. Similarly to vertical illumination, side illumination may not detect high-z materials in cluttered environments. Because dense innocent cargo is generally placed on the floors or bottoms of containers, and long objects such as ingots, rod stock, axles, beams and shafts are generally placed with their long axes horizontal, such cargo may block near-horizontal (side) radiography, requiring manual unloading and/or inspection. Such cargo is much less likely to block near-vertical radiography. Use of two distinct near-vertical X-ray beam angles ensures that innocent but strongly absorbing long objects do not block high energy X-rays in at least one of the beam directions, in contrast to dense blocks of threat high-Z material that strongly absorb high energy X-rays in any direction, thus permitting effective discrimination of threat from innocent cargo. Various other embodiments of the present invention are an improvement over the Annis patent.

Figure 2:
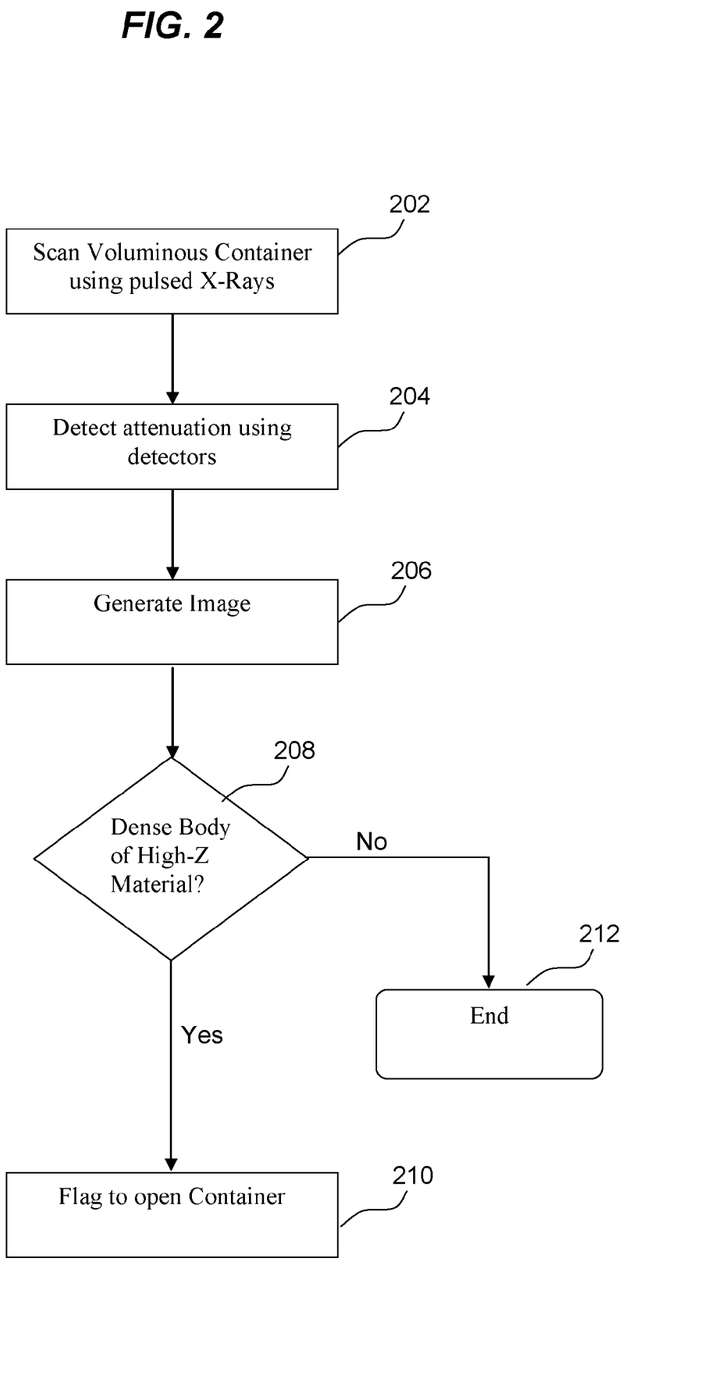
FIG. 2 is a flowchart illustrating the steps of detecting a high-z material in accordance with an embodiment of the present invention.

Embodiments of the present invention may scan and inspect a voluminous container according the exemplary method shown in FIG. 2. Prior to scanning, the high energy x-ray source and components are fixed into the desired position along an incident angle. In some alternative embodiments these components may have moveable pieces that allow the components to align along multiple incident angles. The voluminous container is moved through the radiation and scanned in 202. When a pulsed X-ray source is used, multiple scans may be used as the voluminous container moves through the radiation. The detectors in 204 detect the attenuation of the radiation and send the data to a computer system to be processed. The computer in 206 processes the data to produce a radiographic image. In 208 the radiographic image is analyzed to determine the presence of high-z materials. When such materials are detected, the system flags the container to be manually opened in 210. When no high-z materials are detected, the system ends in 212 and the process may be repeated for the next voluminous container.

The multiple physical processes and complex geometries required to model X-ray radiography imply that quantitative results may be obtained from Monte Carlo calculations. In making such calculation, it is necessary to include electron and positron elastic scattering, bremsstrahlung, collisional ionization and Coulomb pair production, pair annihilation, photon Compton and coherent scattering, photoionization and photopair production and radiative recombination. The spatial, angular and energy distribution of photons, electrons and positrons must be tracked. In auxiliary calculations photoneutron processes and neutron transport and capture must be calculated as well. In order to handle these computationally formidable tasks, the Monte Carlo radiation transport (MCNPX) code may be used.

Figure 3A:
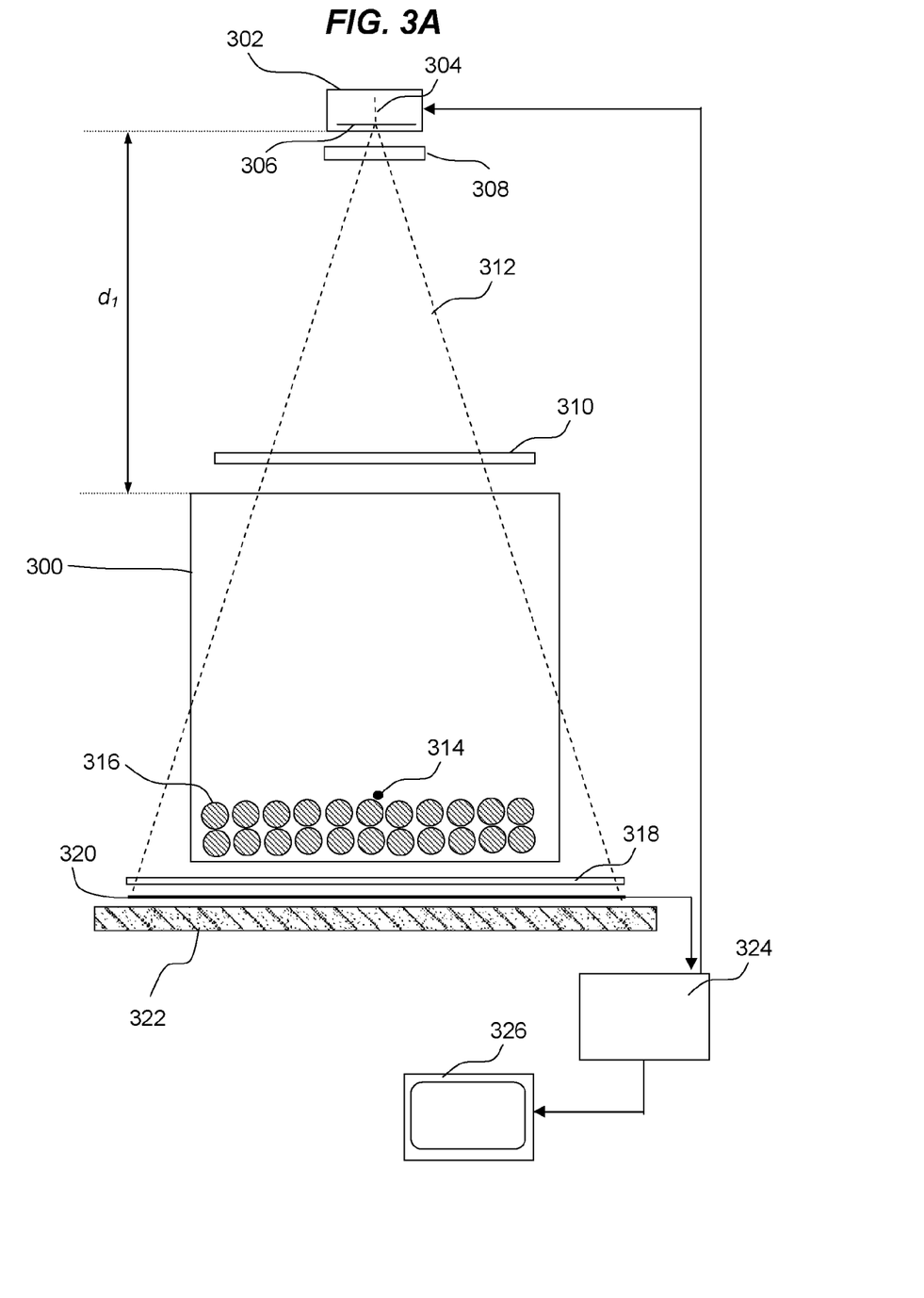
FIG. 3A is a front view of a schematic layout of inspection components in accordance with an embodiment of the present invention.
Figure 3B:
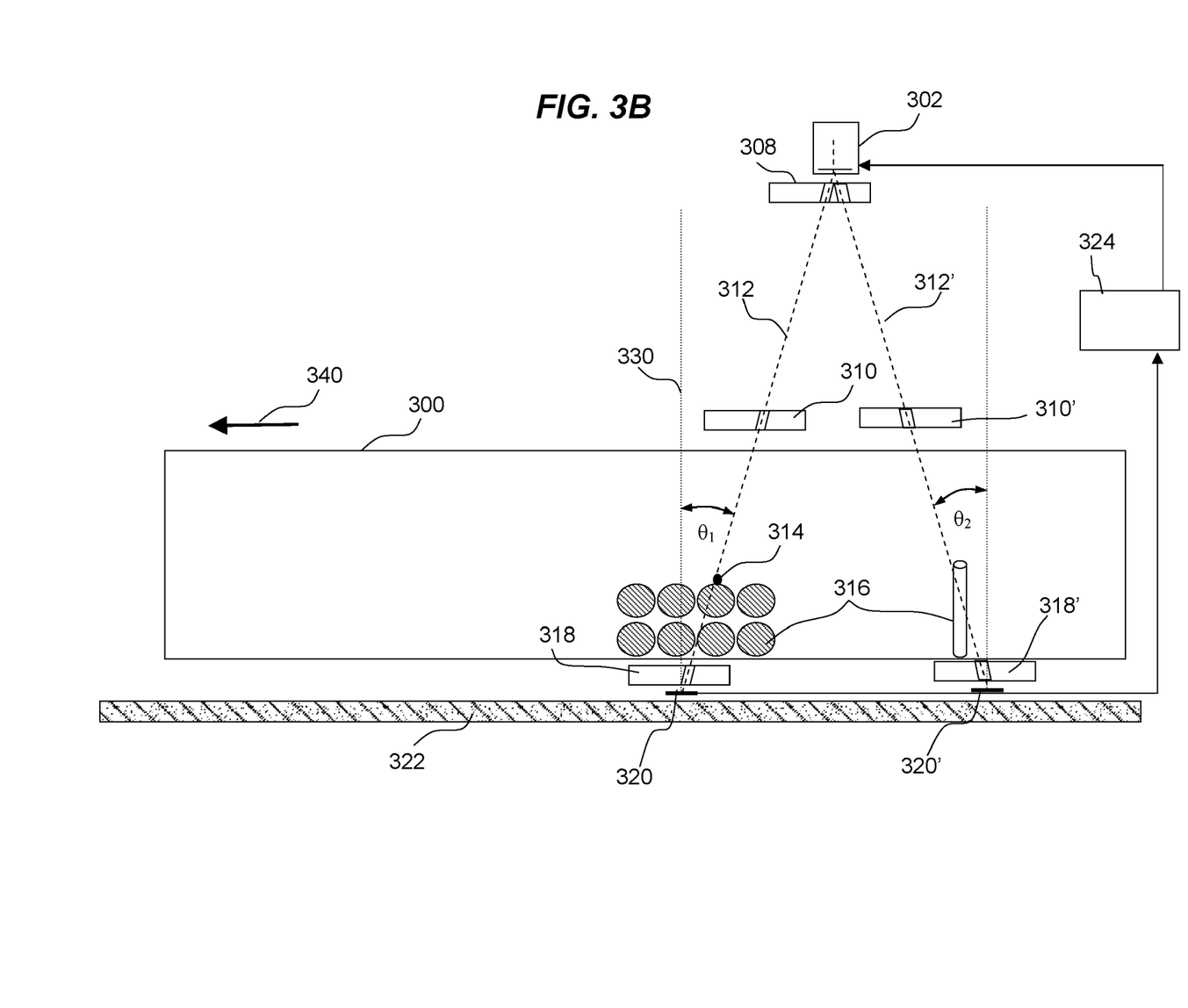
FIG. 3B is a side view of a schematic layout of inspection components shown in FIG. 3A.

FIGS. 3A and 3B illustrate front and side views, respectively, of an exemplary diagram showing a voluminous container 300 under inspection according to various embodiments of the present invention. X-ray source 302 comprises an accelerator (not shown) that produces a beam of electrons 304 which radiate bremsstrahlung when stopped by a converter slab 306. X-ray source 302 is positioned a distance $d_1$ above container 300. X-ray source 302 emits radiation substantially downward. A series of collimators 308, 310 filter the radiation into a fan beam of radiation 312. Fan beam 312 enters container 300 at an incident angle $\theta_1$ and travels through contents, which may include high-z objects 314 and low to medium-z objects 316. Below container 300 is a "Bucky" collimator 318 and detector 320. Detectors 320 may be high-z scintillator detectors. Such high-z scintillator detectors may maximize detector efficiency and permit use of smaller detectors, thus increasing spatial resolution of the system and permitting narrower collimation to minimize scattered radiation background. Behind detector 320 is an absorbing slab 322. The absorbing slab 322 may reduce background scattering from the ground. A computer 324 may control X-ray source 302 and receive data from detector 322. The radiographic image generated by the processing of the data may be displayed on screen 324.

A vertical axis 330 is defined to extend downwardly through container 300. The angle $\theta$ may be approximately 1° to 30° from vertical axis 330 to allow the emitted radiation to travel substantially downward through container 300. In some embodiments this angle $\theta_1$ may be approximately 10° to 15° from vertical axis 330. Such an incident angle may be taken in either direction from the vertical axis. Note that one or more radiographic images may be generated using multiple X-ray detectors positioned at various angles as shown in FIG. 3B. In FIG. 3B there is X-ray source 302 produces radiation for a second series of collimators 308', 310' that create an additional fan beam of radiation 312', "Bucky" collimator 318', and detector 320'. The angles $\theta_1$ and $\theta_2$ shown in FIG. 3B may be different. It should be appreciated that various combinations of X-ray sources and angles that are offset from the vertical axis 330, 330' may be used to inspect container 300.

Container 300 moves through the fan beams of radiation as shown by arrow 340 in a direction that is orthogonal to vertical axis 330. Any suitable mechanisms may move the container such as a conveyer belt, crane, lift, track, slide, trolley, etc. Inspection methods and devices of the present invention may non-invasively scan the container when or after being unloaded from a ship or other mode of transportation or when or before being loaded on a ship or other mode of transportation. For example, the entire longitudinal length of a 40-foot intermodal cargo container may be scanned using 1200 exposures as the container is continuously moved through a pulsed X-ray beam. MeV electron accelerators in the high energy X-ray source may produce micro-second pulses at a rate of several hundred per second thus requiring a scanning time of only a few seconds. This allows quick and efficient non-invasive inspection without causing delays in the movement of the cargo containers.

The X-ray source may be any suitable high-energy radiation device capable of emitting radiation. Embodiments of the present invention may use an electron accelerator that produces a radiation of maximum X-ray energy about 6-20 MeV having a mean energy X-ray energy about half the maximum, i.e. 3-10 MeV. In one embodiment, the high energy X-ray source may emit a beam of 10 MeV electrons. The converter slab used in the X-ray source may be a tungsten converter slab that is approximately 7 mm thick. The slab may also act as a high-pass spectral filter for the emitted radiation. The X-ray source may emit pulses of radiation.

The X-ray source may be placed a distance $d_1$ that is above the container under inspection. Depending on the number of collimators used to create the fan beam and size of the container, the distance may vary. The $d_1$ should be sufficient to allow a single pass of the container. In one embodiment the $d_1$ is approximately 5.2 m to allow the fan beam to be as wide as an intermodal container.

Figure 4:
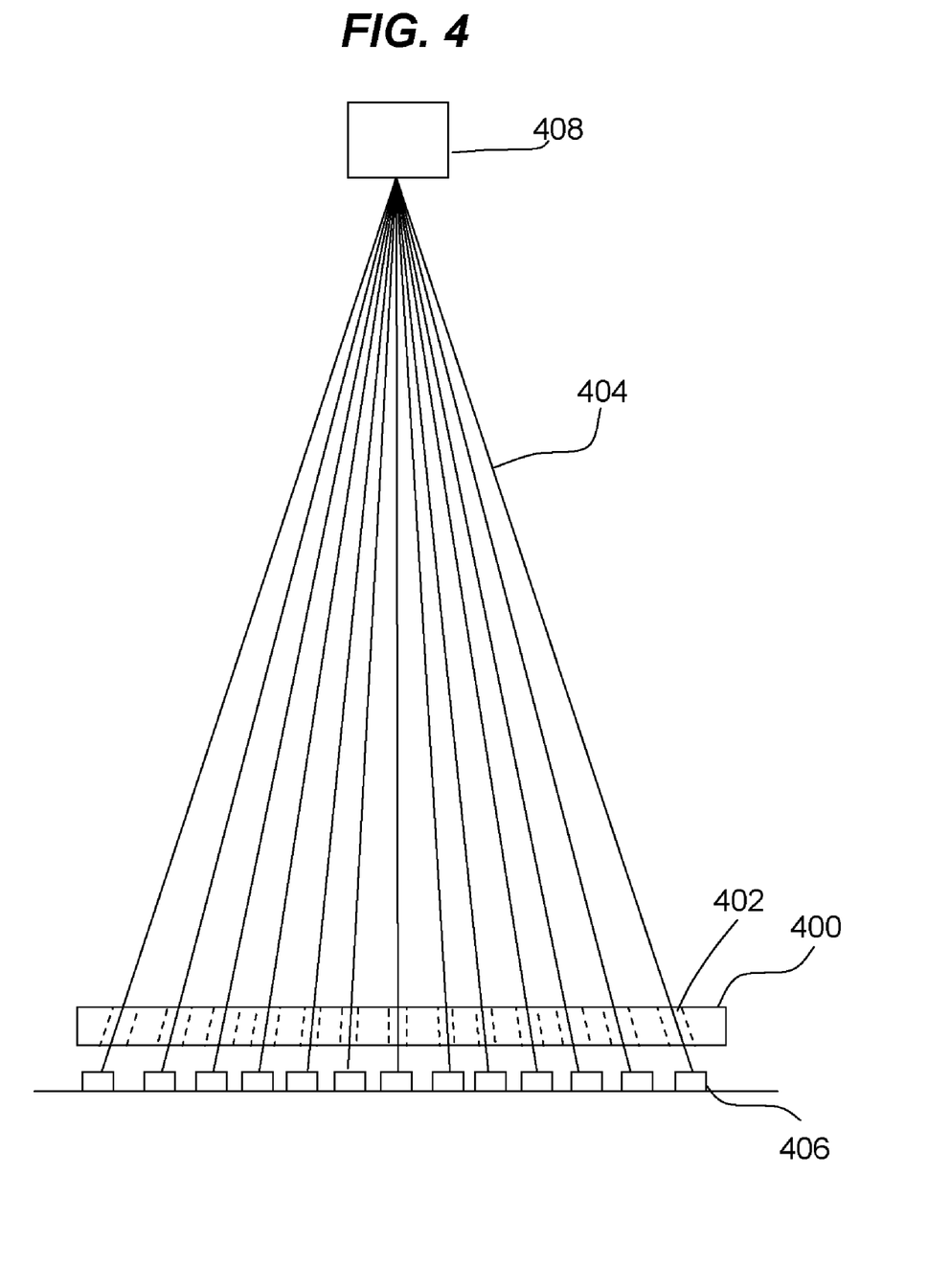
FIG. 4 is a cross-section front view of a Bucky collimator in accordance with an embodiment of the present invention.

Extensive collimation as shown in FIGS. 3A-3B may be necessary to reduce the scattering of radiation into the deep absorption minimum produced by the high-z material. Although two collimators are shown above the container in FIGS. 3A and 3B, any number of collimators may be used. The slots in each collimator used may be substantially aligned with along the incident angle $\theta$. In one embodiment, there may be an approximately 10 mm wide slot collimator of approximately 0.1 m thick tungsten below the X-ray source. A similar slot collimator may be placed above the container that matches an approximately 10 mm wide detector array. The detectors are modeled as a transverse row of point sensors approximately 0.2 m below the container, spaced approximately 10 mm apart, which respond to the X-ray energy flux, a fair approximation to the behavior of several practical scintillators. A lower collimator, referred to a Bucky collimator, may be placed between the container and the detectors. An end view of an exemplary Bucky collimator is shown in FIG. 4. Bucky collimator 400 consists of an approximately 0.16 m thick slab of tungsten, lead, or similar X-ray absorbing material with holes or tubes 402 bored or otherwise formed (such as by casting or punching) the lines 404 from each detector 406 to the radiation source 408. Tubes 402 may be approximately 5 mm wide and are arranged in a radially manner in relation to the radiation source 408. Bucky collimator 400 may reduce the scatter to improve the quality of the radiographic image generated from detectors 406. One or more additional collimators may be placed between the container and Bucky collimator 400. Note a Bucky collimator may have more holes or tubes than shown in FIG. 4 depending on the application. For example, in one embodiment the numbers of holes or tubes corresponds to the number of detector elements in the detector array.

Embodiments of present invention use a source of high energy X-rays (and necessarily high energy electrons). These high energy sources increase the overall transmission, and improve the discrimination between high-Z and low or medium-Z opacities. In addition the coherent and Compton scattering cross-sections are less and the bremsstrahlung radiation pattern and the Compton scattering cross-section are more forward-peaked. Scattered radiation tends to fill in the deep and spatially localized absorption minima of chunks of high-Z material, which are their characteristic signature. This may be minimized, as discussed above, by increasing the electron (and therefore X-ray) energy, and by use of collimators, including a Bucky collimator, that intercepts scattered radiation arriving on oblique paths.

One problem with using high energy sources of more energetic X-rays (and electron accelerators) is photoneutron production. For most nuclei the photoneutron energy threshold is about 8 MeV, so electron beams of energy greater than 8 MeV will produce some X-rays energetic enough to make neutrons and lead to a low level of neutron activation in innocent cargo.

The induced radioactivity in the cargo is negligible. For example, depositing 10 MeV of X-ray energy (typically about three X-rays) in a 10 mm×10 mm detector on a path through the center of a 5 kg plutonium sphere in a very cluttered container (FIG. 4) will show the depth of absorption to a factor of about two, sufficient for the radiographic image to show the dense high-Z object. From the calculated results, this would require $1.1 \times 10^{11}$ 10 MeV electrons per image slice, or about 0.18 Joule (small compared to the capability of industrial radiographic accelerators). The container would be irradiated with about $1.3 \times 10^{-3}$ J/m$^2$ of X-rays on its upper surface, or a total of about 40 mJ of energetic X-rays. Even at photon energies of 10-20 MeV the photoneutron cross-section is no more than 0.01 of the total cross-section, so that these $2.5 \times 10^{10}$ X-rays produce, at most. $2.5 \times 10^8$ photoneutrons. This should be compared to the cosmic ray neutron production of 0.1/kg/sec, or $3 \times 10^3$/sec for a 30 MT cargo. Even the highest energy radiography produces a neutron fluence and activation less than that produced by a day of cosmic ray exposure.

The neutron production in the collimators, which absorb nearly all the X-rays, is also small. The 1200 pulses required to scan a 40 foot (12 m) container in 10 mm slices contain $1.3 \times 10^{14}$ electrons. Using MCNPX, the photoneutron production in the 7 mm tungsten converter followed by a 0.1 m lead collimator is calculated. The neutron to electron ratio is $7 \times 10^{-6}$ at 10 MeV, $7 \times 10^{-4}$ at 15 MeV and $2.5 \times 10^{-3}$ at 20 MeV (where the bremsstrahlung spectrum overlaps the nuclear giant dipole resonance). For 10 MeV electrons the dose to an unshielded operator at 20 m range who examines one container per minute would be 500 nanoSv/hr (using the standard relation of flux to dose rate). This is a factor of 50 times less than the occupational limit of 0.05 Sv/year (25 microSv/hr), and only a small fraction of the typical 2 mSv/year natural background. The advantages of radiography at energies of 10 MeV may be obtained with negligible personnel exposure. Further reduction in doses to operators, bystanders and the environment may be obtained with use of shielding.

EXAMPLES

The embodiments of the present invention will now be described by way of the following examples.

Example 1

Figure 5:
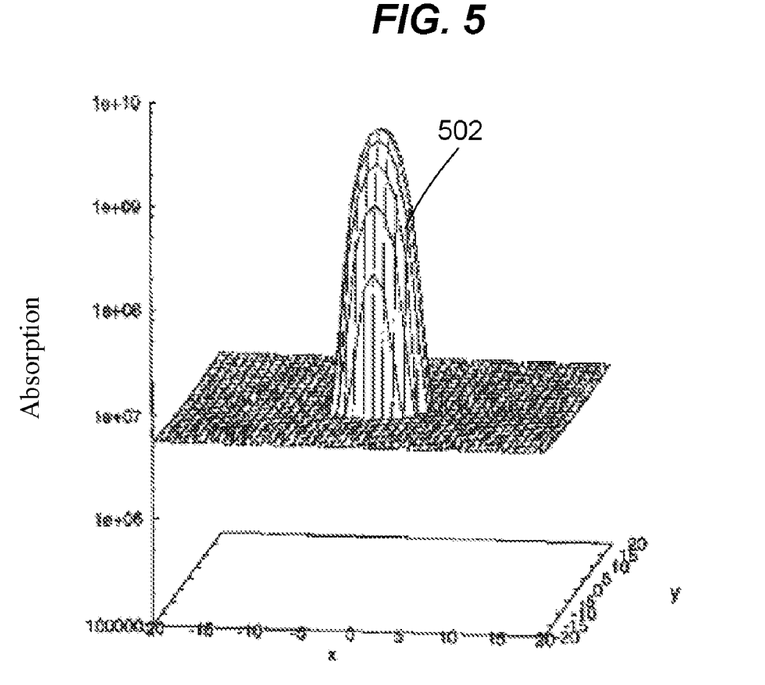
FIG. 5 is a radiographic image model of a high-z material in an uniformly filled voluminous container.

FIG. 5 is a computer model radiographic image obtained by detecting a 5 kg sphere of 6-plutonium (r=0.0422 m) at the center of a container uniformly filled with iron to a density of 300 kg/m$^3$. This model is based on using an X-ray source is a beam of 10 MeV electrons which radiate bremsstrahlung when stopped by a 7 mm thick tungsten converter slab at a height of 5.2 m above the top of the container using a layout as shown in FIGS. 3A and 3B. Below the converter there is a 10 mm wide slot collimator made of tungsten 0.1 m thick. A similar slot collimator above the container matches a 10 mm wide detector array. The detectors are modeled as a transverse row of point sensors 0.2 m below the container, spaced 10 mm apart, which respond to the X-ray energy flux, a fair approximation to the behavior of several practical scintillators. A final Bucky collimator between the container and the detectors consists of a 0.16 m thick slab of tungsten with holes of 5 mm diameter bored along the lines from each detector to the radiation source. The incident electron beam is taken to be 13° from vertical. The radiographic image may be obtained using 1200 exposures of 40-foot voluminous container that is moved through a pulsed X-ray beam.

The radiographic image shown in FIG. 5 illustrates the power of high energy X-ray radiography. The plutonium sphere is clearly and unambiguously revealed by the large peak 502.

Example 2

Figure 6:
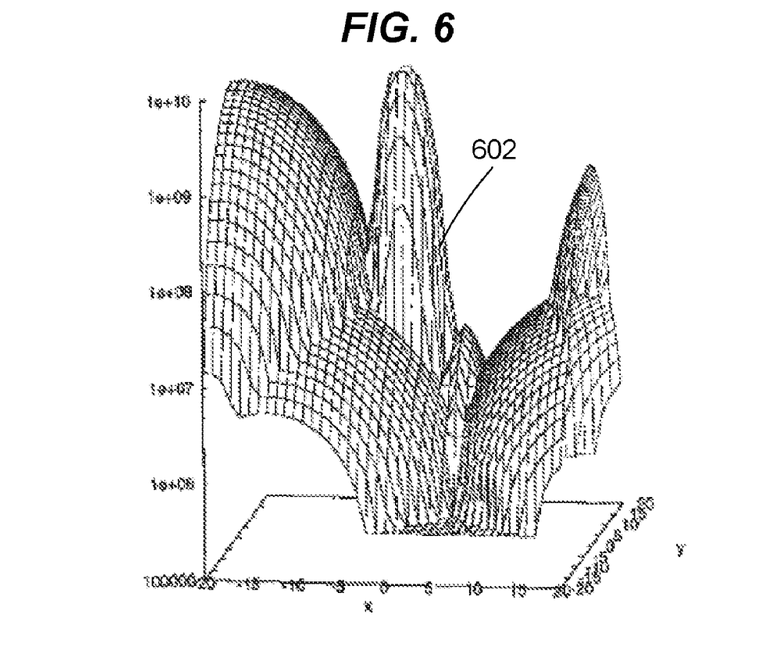
FIG. 6 is a radiographic image model of a high-z material in a cluttered voluminous container.

Many containers will contain pockets of innocent dense medium-Z material (large castings such as engine blocks, ingots, rod stock, etc.), and a terrorist may fill the empty space in a voluminous container with such objects in order to disguise a dense piece of fissionable material. Radiography must identify, or exclude the presence of, a threat in such a cluttered environment. FIG. 6 therefore shows the radiograph of a 5 kg sphere of 6-plutonium (r=0.0422 m) at the center of a very cluttered container. In addition to the threat object, it contains 230 spheres of half-density iron that model an automotive engine block, with internal voids, each 0.20 m in radius, totaling 30 MT. The iron spheres arc in planar square arrays, 0.50 m apart, 0.55 m and 1.05 m below the container's midplane.

If the direction of irradiation were vertical the plutonium sphere would not be detectable because the line of sight through it would pass through the centers of two of the iron spheres, for a total of 3140 kg/m$^2$ of iron. It is for this reason that oblique illumination was chosen. The plutonium is detectable even though lines of sight through it pass through one of the iron spheres because it has a characteristic signature—a combination of high attenuation and small dimension transverse to the beam—which is found only for massive chunks of high-Z material and for paths along the long axes of long slender objects.

In innocent cargo long slender dense objects are packed with their longest axes horizontal, and dense loose cargoes are spread on the floor of the container. Therefore, near-vertical irradiation will almost never show regions of intense absorption in innocent cargo. In contrast, horizontal irradiation would often find this "false positive" result, requiring manual unloading and inspection. Another advantage of downward near-vertical illumination is that the Earth is an effective beam-stop; combined with a thin lead ground plane, its albedo is negligible and additional shielding would not be required.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An inspection device for inspecting a voluminous object comprising:
   a high-energy source for generating a first set of pulsed beams of radiation, wherein the plurality of pulsed beams of radiation are transmitted substantially downward along an incident angle to a vertical axis extending through the voluminous object;
   means for discriminating against scattered radiation from the plurality of pulsed beams of radiation that are transmitted through the voluminous object;
   means for generating a radiographic image based on detected attenuation corresponding to the plurality of pulsed beams of radiation transmitted through the voluminous object; and
   means for determining that a high-z material exists in the voluminous object based a localized high attenuation in the radiographic image.

2. The inspection device of claim 1, wherein the high energy source produces the plurality of pulsed beams of radiation of maximum X-ray energy about 6-20 MeV having a mean energy X-ray energy about half the maximum.

3. The inspection device of claim 1, further comprising a means for collimating each of the plurality of pulsed beams of radiation into a fan beam of radiation prior to transmission through the voluminous object.

4. The inspection device of claim 3, wherein the fan beam of radiation is at least as wide as the width of the voluminous container.

5. The inspection device of claim 1, wherein the means for reducing scattering into the detecting means is placed between the voluminous container and the detecting means.

6. The inspection device of claim 1, wherein the incident angle is approximately 1° to 30° from the vertical axis.

7. The inspection device of claim 1, wherein the voluminous object is an intermodal container.

8. The inspection device of claim 1, further comprising a second set of pulsed beams of radiation generated from the high-energy source, wherein the second set of pulsed beams of radiation are transmitted substantially downward along a second incident angle to the vertical axis.

9. An inspection device for inspecting a voluminous object comprising:
   a high-energy source for producing a plurality of pulsed beams of radiation at an incident angle to a vertical axis extending through the voluminous object;
   one or more upper collimators for filtering the plurality of pulsed beams of radiation into a fan beam of radiation having a width approximate to the width of the voluminous object;
   one or more lower collimators for shielding scattered radiation from the fan beam of radiation that is scattered within the voluminous object; and
   a detector array for generating an attenuation signal based on radiation transmitted through the lower collimator, wherein the high-energy source is positioned above the voluminous object, the one or more upper collimators being positioned between the high-energy source and the voluminous object, the one or more lower collimators being positioned directly below the voluminous object and the detector array is positioned below the one or more lower collimators.

10. The inspection device of claim 9, wherein the one or more collimators have slots along the direction of the incident angle.

11. The inspection device of claim 9, wherein the lower collimator has slots along the direction of the incident angle.

12. The inspection device of claim 9, wherein the incident angle is approximately 1° to 30° from the vertical axis.

* * * * *